United States Patent [19]

Muller

[11] 4,410,643

[45] Oct. 18, 1983

[54] METHOD OF MAKING AND THE COMPOSITION FOR AN INITIALLY ERASABLE INK FOR A BALL POINT WRITING INSTRUMENT

[75] Inventor: Frank A. Muller, Los Angeles, Calif.

[73] Assignee: Scripto, Inc., Doraville, Ga.

[21] Appl. No.: 376,119

[22] Filed: May 7, 1982

Related U.S. Application Data

[63] Continuation-in-part of Ser. No. 247,982, Mar. 26, 1982, Pat. No. 4,349,639.

[51] Int. Cl.$^3$ .................... B41K 7/00; C08K 5/01; B43K 7/10; C09D 11/18
[52] U.S. Cl. ................... 523/161; 524/525; 524/575; 401/209
[58] Field of Search ............ 523/161; 524/525, 575; 401/209, 190

[56] References Cited

U.S. PATENT DOCUMENTS

| | | |
|---|---|---|
| 3,875,105 | 4/1975 | Daugherty et al. ............ 106/19 |
| 4,097,290 | 6/1978 | Muller et al. ................. 106/32 |
| 4,297,260 | 10/1981 | Feree et al. .................. 523/161 |
| 4,329,262 | 5/1982 | Muller ........................ 523/161 |
| 4,329,264 | 5/1982 | Muller ........................ 523/161 |

OTHER PUBLICATIONS

Derwent Abst. 27627E/14, Feb. 1982, J5703173, Mitsubishi Pencil.
Derwent Abst. 06981D/05, Nov. 1981, J55152769, Pilot Pen.
Derwent Abst. 27104E/14, Feb. 1982, J57034170, Mitsubishi Pencil.
Derwent Abst. 55103D/30, Jul. 1981, JJP8101858, Pentel KK.
Derwent Abst. 42733D/24, Apr. 1981, J56043374, Pilot Ink KK.
Derwent Abst. 58013D/32, Jun. 1981, J56076477, Pentel KK.
Derwent Abst. 74849D/41, Aug. 1981, J56109265, Pentel KK.
Chem. Abs. 94(141410), 1981, ∫Ink Compositions for Ball Point Pens", Pilot Japanese Patent Application 61368/79.

*Primary Examiner*—Melvyn I. Marquis
*Assistant Examiner*—Herbert J. Lilling
*Attorney, Agent, or Firm*—Newton, Hopkins & Ormsby

[57] ABSTRACT

A method for making and the composition for an initially erasable ink for a ball point writing instrument which ink is characterized by its initial erasability by ordinary pencil erasers when applied by a ball point writing instrument to an absorbent paper-like writing surface and which thereafter develops permanence. The method includes the steps of: (a) selecting elastomeric material from synthetic rubbers not having the chemical structure of natural rubber, with or without cis-1,4-polyisoprene, and mixtures thereof; (b) masticating the selected elastomeric material by subjecting same to high shear stresses; (c) coloring said masticated elastomeric material by forced impregnation of colored pigments into said elastomeric material while subjecting same to further shear stresses; and (d) mixing the pigmented elastomeric material with a solvent system that includes a volatile component and an essentially non-volatile low viscosity component in the form of a hydrocarbon oil, an essential oil, a petroleum derivative, a plasticizer or mixtures thereof to form an erasable ink composition. The ink composition comprises a pre-pigmented elastomer and a solvent system that contains a volatile component, a non-volatile low viscosity component, and a non-volatile component having a boiling point of 300° or greater.

5 Claims, No Drawings

METHOD OF MAKING AND THE COMPOSITION FOR AN INITIALLY ERASABLE INK FOR A BALL POINT WRITING INSTRUMENT

CROSS-REFERENCE TO RELATED APPLICATION

This is a continuation-in-part of applicant's prior copending application Ser. No. 247,982, filed Mar. 26, 1982 which issued on Sept. 14, 1982 as U.S. Pat. No. 4,349,639 and any disclosure material contained therein and not expressly carried forward and set out herein is expressly incorporated by reference.

OTHER COPENDING APPLICATIONS

This application is also co-pending with my following applications:

1. Ser. No. 136,787, filed Apr. 3, 1980—which issued on May 11, 1982 as U.S. Pat. No. 4,329,264.
2. Ser. No. 247,363, filed Mar. 25, 1981—which issued on May 11, 1982 as U.S. Pat. No. 4,329,262.

Field of the Invention

The present invention pertains to the composition for an initially erasable ink for a ball point writing instrument which ink is characterized by its initial erasability by ordinary pencil erasers when applied by a ball point writing instrument to an absorbent paper-like writing surface and which thereafter develops permanence.

Description of the Prior Art

Many frequently interrelated factors must be taken into account in the formulation of a writing medium. These factors fall into two categories, namely, those which stem from the type writing instruments to be used in dispensing the writing medium onto the writing surface, and those which are concerned with the desired characteristics that the writing medium possesses after being dispensed.

The principal type of writing instrument that is to be used with the ink composition of the present invention is a ball point writing instrument.

Insofar as the characteristics of the writing medium in the "after dispensed" state are concerned, appearance and relative indelibility are the most important. In most cases, the appearance of the writing medium means little more than the color of the written line. Indelibility is related to the ease of removal of the written line. Thus, an indelible writing medium is one which is resistant to removal from the writing surface. Obtainment of a high degree of indelibility is not always necessarily desirable. In some instances one may want a writing medium which immediately is not easily removable by mechanical means from the writing surface, while in other instances one may want a writing medium which at least initially is easily removable but which may attain permanence or indelibility over an extended period of time, as for example, over a period of hours. If such a medium is to be considered as being truly erasable, it must be readily removable at least during an initial period of time from the substratum to which it has been applied without any damage of any significant degree to the area of the substratum involved.

In order to understand the nature of this invention, consideration must first be given to the conditions which the formulator of an erasable writing medium must avoid. This in turn requires at least an elementary knowledge of the structure of paper, since paper is the substratum most commonly employed as a writing surface.

Paper is essentially a mat of randomly oriented cellulose fibers. Thus, paper consists of solid structural members, namely, the cellulose fibers, having numerous minute voids therebetween. From the description, it may readily be seen that the formulator or designer of an erasable writing medium must prevent the colorant portion of the medium from penetrating to any substantial degree into the voids in the surface being written upon because if there is substantial penetration into the voids the subsequent removal of the colorant by mechanical means cannot be accomplished without damage to the writing surface. Likewise, it may readily be seen that for a writing medium to be erasable, the colorant particles must be prevented from affixing themselves with any substantial degree of permanence, either by chemical reaction or as a result of mere physical attraction, to the solid members of the paper substratum.

In the past, attempts to achieve an erasable writing medium for a ball point pen usually have been unsuccessful. Of course, one may use a superabrasive eraser to remove ordinary ball pen inks from the paper substratum normally used for writing purposes. As discussed above, such substratum is porous to some degree and the ball pen inks in ordinary usage tend to penetrate those pores. In addition, the colorants in such inks tend to affix themselves to the fibers which constitute the solid portion of the substratum. Therefore, the only way to erase markings made with ordinary ball pen inks is to physically remove a substantial number of the fibers in the vicinity of the markings. As a result, the paper substratum is generally so damaged during the erasure process that it is rendered unsuitable for any further use as a writing surface.

Attempts have been made to modify ordinary ball pen ink so as to prevent the colorant portion thereof from penetrating the pores of the paper substratum. These attempts consisted of substituting pigment-type colorants for the dye-type colorants normally used in ball pen inks. The reasoning behind this approach was that since pigment-type colorants normally have a greater particle size than dye-type colorants, the pigment-type colorants would become substantially immobile on deposition upon the surface of the paper substratum and, therefore, would not tend to penetrate into the pores of the paper. However, this line of reasoning overlooked the fact that in a ball point writing instrument, the ink is dispensed through a very minute clearance between the ball and socket and that any pigment-type particle which is small enough to be so dispensed will tend to behave as if it were a dye-type particle. Therefore, the colorant portion of such inks was not immobilized to any significant degree and as a consequence, no substantial advantage was gained through substituting the pigment-type colorant for the dye-type colorant in ordinary ball pen inks insofar as erasability was concerned.

As stated above, if a writing medium is to be erasable, the colorant content therein, after being dispensed onto the paper substratum, must remain in such a location that it can be readily removed therefrom with a substantially non-abrasive eraser. Further, the colorant must not be allowed to affix itself either through chemical reaction or through ordinary physical atraction with any substantial degree of permanence to the written-upon surface. If these objectives are to be accomplished, the colorant content of the writing medium must be prevented from penetrating the pores of the substratum and must be shielded from intimate contact with the solid members of the writing surface. Further, if such a medium is to be dispensable from a ball point pen, it follows that the medium must possess physical characteristics which do not differ widely from those of ordinary ball pen inks.

Some success has been achieved in producing erasable ball point pen inks that are transitorily erasable, for example, my prior U.S. Pat. No. 4,097,290, hereinafter referred to as Muller et al., and U.S. Pat. No. 3,875,105 to Daugherty et al. Both of these patents teach the use of an elastomer. The Daugherty et al. patent teaches polyvinyl methyl ether and the parent application thereof, Ser. No. 751,759, teaches Natsyn 2200 which is a synthetic rubber having a chemical structure like natural rubber. My prior Muller et al. patent teaches natural rubber or rubber which essentially duplicates the chemical structure of natural rubber. Both patents disclose the use of a volatile solvent.

Daugherty et al. discloses the volatilizing component as being a solvent for the polyvinyl methyl ether matrix and having an evaporation rate of 3 to 15 on a relative numerical scale on which ethyl ether is assigned an evaporation rate of 1. Daugherty et al. also teaches the possible inclusion of non-volatile solvents for use as pigment dispersing agents of viscosity adjustment solvents. My prior Muller et al. patent discloses a volatile low boiling organic solvent for the elastomer having a boiling point less than 180° C. and exhibiting 100% evaporation within 60 minutes in combination with a non-volatile organic liquid solvent having a high boiling point in excess of 300° C. In summary, both my prior Muller et al. patent and the Daugherty et al. patent teach an erasable ink that includes the following: (1) the use of a pigment as a colorant; (2) an elastomer; and (3) the use of mixtures of volatile and non-volatile solvents.

My above-referenced copending application Ser. No. 136,786 relates to ink compositions of similar characteristics to the present invention. However, the compositions disclosed are directed to the use of a solvent system which contains a low viscosity solvent for the elastomer component with optional inclusion of minor amounts of volatile solvent for polymer and/or fatty acid lubricant, in addition to pigment.

My above-referenced copending application Ser. No. 247,363 relates to ink compositions of similar characteristics to the present invention. However, the compositions disclosed therein are directed to elastomer component which is natural rubber, synthetic rubber which essentially duplicates the chemical structure of natural rubber and mixtures thereof. The solvent system therein comprises a volatile component in amount of at least 8% by weight of the ink and a low viscosity essentially non-volatile component having a boiling point of less than 300° C. and above 180° C., and an essentially non-volatile component having a boiling point greater than 300° C., in addition to pigment.

My above-reference copending application Ser. No. 247,982, of which this application is a continuation-in-part, relates primarily to the method of making ink compositions of similar characteristics to the present invention, and to compositions made by that method. Basically, the method relates to milling pigment into elastomer component, whereafter the pre-pigmented elastomer is dispersed in solvent system.

Japanese patent application No. 61368/79 filed May 18, 1979 by Pilot Pen Co. Ltd. which was published on Nov. 18, 1980 was cited in my 1981 co-pending applications. This Japanese application discloses an elastomer/solvent system/pigment combination which is and will remain truly erasable. To this combination a water soluble dye is added which ultimately is dissolved by the water that is contained in the atmosphere and in the substrate so that the dissolved dye will penetrate into the substrate to produce an indelible trace.

The below-listed prior patents and applications are made of record herein under 37 C.F.R. §1.56:

(1) Daugherty et al., U.S. Pat. No. 3,875,105, issued Apr. 1, 1975 and abandoned application Ser. No. 751,759 filed Oct. 16, 1968, referenced therein;

(2) Muller et al., U.S. Pat. No. 4,097,290, issued June 27, 1978; and (3) Japanese patent application No. 61368/79, filed May 18, 1979 and laid open and published on Nov. 28, 1980 (Pilot Pen Co. Ltd.)

SUMMARY OF THE INVENTION

A method for making and the composition for an initially erasable ink for a ball point writing instrument which ink is characterized by its initial erasability by ordinary pencil erasers when applied by a ball point writing instrument to an absorbent paper-like writing surface and which thereafter develops permanence. The method includes the steps of: (a) selecting elastomeric material from synthetic rubbers not having the chemical structure of natural rubber, with or without cis-1,4-polyisoprene, and mixtures thereof; (b) masticating the selected elastomeric material by subjecting same to high shear stresses; (c) coloring said masticated elastomeric material by forced impregnation of colored pigments into said elastomeric material while subjecting same to further shear stresses; and, (d) mixing the pigmented elastomeric material with a solvent system that includes a volatile component, a non-volatile low viscosity component and a non-volatile component having a boiling point of 300° C. or greater to form an erasable ink composition.

The erasable ink composition of the present invention comprises a pre-pigmented elastomer and a solvent system therefor. The solvent system includes a volatile component and an essentially non-volatile component in which the volatile component has a boiling point less than about 180° C. and said essentially non-volatile component includes a low viscosity hydrocarbon oil, an essential oil, a petroleum derivative, a plasticizer or mixtures thereof having a boiling point less than 300° C. and greater than about 180° C. and a further component that has a boiling point of 300° C. or greater. The pre-pigmented elastomer is selected from masticated synthetic rubbers not having the chemical structure of natural rubber, with or without cis-1,4-polyisoprene, and mixtures thereof.

Therefore, it is the object of the present invention to produce an erasable ball point ink composition that possesses very smooth writing characteristics and that becomes permanent quicker without compromising its short term erasability by ordinary pencil erasers.

It is the further objective of the present invention to utilize a unique method of manufacture that includes the steps of (a) providing a pre-pigmented elastomer component in which pigment is substantially homogeneously distributed throughout and aggregated onto molecular chains of the elastomer; (b) dispersing the elastomer component with molecular chain-attached pigment in a solvent system, the solvent system comprising a volatile component which contributes to initial erasability of the ink and an essentially non-volatile component which contributes to development of permanence of the ink; and (c) controlling initial erasability of the ink composition and capability of subsequently developing permanence when applied to the writing surface with the writing instrument by selecting, for the elastomer component, elastomeric materials which exhibit predetermined molecular weight distribution over a wide molecular weight range.

DESCRIPTION OF THE ILLUSTRATIVE EMBODIMENTS

In this invention, a truly smooth writing erasable writing medium has been obtained by uniquely combining selected materials in selected quantities and which utilizes pigmented elastomeric material and a solvent system that includes an essentially non-volatile low viscosity medium boiling component, a non-volatile high boiling organic solvent or plasticizer, so as to produce a writing medium which can be successfully dispensed in a ballpoint pen and which is formulated and functions as described hereinbelow.

The Improved Erasable Ball-Pen Ink Manufacturing Process

A better rubber compounding and subsequent ink mixing process is hereinafter described. This is a process in which rubber is initially "masterbatched" on a two roll mill prior to solution. This process has been particularly successful, despite the high variability of the properties of rubbers, in deriving maximum degrees of ink performance and uniformity from batch to batch.

Heretofore erasable ball-pen inks essentially consisting of rubber, pigments, solvents and additives are subject to having such consumer appeals as smoothness, erasability, color intensity, and cleanliness of writing which appeals can be compromised primarily by the variability of the types and methods of processing rubbers and secondarily by the quality and uniformity of pigment dispersion in the ink.

The production of the present improved ball-pen ink depends on three primary factors besides its preferred formulation. First, filtering of such high viscosity inks is impractical. Elastomers, such as styrene butadiene rubber, polyisobutylene rubber and cis-1,4-polyisoprene, should be selected to have a certified grading in regards to the amounts of included gel and non-rubber solid particles.

Secondly, the elastomers must be correctly masticated. Hard rubber will cause the ink not to flow properly, soft rubber will cause the ink not to erase, or write cleanly. Once adequately masticated, the rubber must also remain indefinitely in that state.

Thirdly, the correct method of coloration is important in insuring the quality and uniformity of pigment dispersion. This should be of the maximum homogeneous type so that pigmentation can take place in the early part of the ink making process, followed by complete integration with the remaining elements to eliminate color phase-separation, and to promote optimum erasability by having as many particles of pigment surrounded by or entrapped in as many elastomer molecules as practically possible. All else remaining constant, ink erasability and cleanliness of writing performance characteristics can only be controlled if the pigment is homogeneously dispersed in the elastomer matrix which is, in turn, homogeneously dispersed into the solvent or vehicle to provide an ink having the desired viscosity so that it will not initially penetrate into the paper fibers. Because of their small particle size, approximately 0.05 microns, pigments tend to divide equally between the solvent and elastomer phases. If solvent containing pigments separates from the elastomer matrix either because of dispersion instability, or improper mixing, the viscosity of some localized regions of the ink will be very low resulting in non-erasability concurrent with smudgy writing quality.

Selection of the Optimum Types of Elastomers

It is preferable that the elastomeric material or materials chosen exhibit a predetermined substantially uniform molecular weight distribution over a wide molecular weight range of about 100,000 to 900,000.

With the objective of minimizing milling time, the rubbers chosen are certified to have relatively low, and narrow (20 units) initial Mooney viscosities at 212° F. It has been found as unique to erasable inks that the use of rubbers that have large gel phases present promotes ink phase-separation while those that have retained dirt cause stoppages during writing.

Mastication Procedure

Using a two-roll rubber mill, each peptized elastomer is normally softened separately to the same Mooney viscosity range between 17 and 27, rather than for a fixed time. It is helpful during rubber mastication to add a peptizing agent, such as Pepton 44, activated dithio bis-benzanilide, manufactured by the Organic Chemicals Division of American Cyanamid, Bound Brook, N.J.

A suitable type two-roll mill can be obtained from the Farrel Company located in Connecticut.

Further changes in viscosity can be retarded by incorporating a small amount of anti-oxidant prior to coloration. A suitable anti-oxidant is AO 2246, 2-2 ethylene bis-[4-methyl-6-tertiary butyl] phenol, also manufactured by the Organic Chemicals Division of American Cyanamid, Bound Brook, N.J.

Incorporation of Color into Rubber

Subsequent coloration using dry, pre-wetted or preferably pigmented pastes, is performed on the same two-roll mill. Although both premasticated rubber compounds can be combined, a normal procedure has been to color them separately (to minimize weighing errors), with a paste consisting of about 50% pigments dispersed in a rubber compatible vehicle. Suitable rubber compatible vehicles for the pigment paste have been found to include non-volatile high viscosity mineral oils having a viscosity in the range of 50–60 centipoise or more and plasticizers such as dioctyl phthalate, diisodecyl phthalate and tricresyl phosphate. Increased degrees of pigment dispersion have incidently been achieved by incorporating flushed pigments, along with the dry pigments and vehicles that comprise the paste formula which may also include an amount of hydrocarbon resin. (This is useful, particularly when working with relatively light bodied liquids, such as Penreco 2251 oil having a viscosity of 1.45 cps and Penreco 2257 oil having viscosity of 1.5 cps.) By "flushed pigments", I mean viscous commercially available high tinting strength pigment dispersions that are prepared by directly replacing water from presscakes with hydrophobic vehicles such as oils, and varnishes.

The high shear stresses that prevail between the rolls as the rubber and pigment are combined provide for optimum homogeneity. Continuous mixing, cutting and folding not only disperses the pigment, but pre-dissolves the rubber in the paste vehicle to aid subsequent ink mixing as well as preventing chain recombination on storage. Forced pigment impregnation also tends to distribute color uniformly among all the molecular chain lengths, to prevent localized aggregation onto shorter chains that would contribute to non-erasability by being more rapidly absorbed into the paper.

Ink Mixing Procedure

Once all of the desired pigment has been incorporated, the colored masterbatches are stripped onto protective sheets of polyethylene until such time whence a batch of ink is ready to be made. The approximately $18'' \times 8'' \times \frac{1}{2}''$ sized strips are then cut and weighed for solution in appropriate solvents using a planetary type mixer. A suitable planetary type mixer can be obtained from Ross & Sons Co., Inc. of New York. A 40-gallon mixer will develop the following range of shear forces:
Range: $1.0 \times 10^3$ to $4.0 \times 10^3$ KG. Meter sec$^{-2}$ (Newtons) or $0.7 \times 10^3$ to $3. \times 10^3$ Ft. Pounds sec$^{-2}$ (Poundals)

Alternatively, mixing can be conducted in a sigma-blade kneader mixer. Such a mixer in a 100 gallon size is generally capable of developing the following range of shear forces:
Range $5.0 \times 10^3$ to $2.0 \times 10^4$ KG. Meter Sec$^{-2}$ (Newtons) or $3.0 \times 10^3$ to $1.5 \times 10^4$ Ft. Pounds Sec$^{-2}$ (Poundals)

Additional pigment paste can be added during the mixing cycle when the mixture of pigmented rubber and solvents have attained a maximum viscosity (to take full advantage of the relatively higher levels of shear that exist in the mixing at maximum viscosity.) Because the walls of the mixing vessel are already coated with a relatively thick viscous layer of colored ink, the likelihood of "free" paste remaining undispersed is minimized. Transfer of ink after a period of approximately three hours mixing time is provided by the use of a diaphragm type pump.

It has been seen from the aforegoing that a sphere of action has been taken to ensure the production of an ink that is optimally suitable for the service conditions it will be required to meet.

SUMMARY

The erasable ball pen ink manufacturing process of the present invention has incorporated the following unique features: (1) pre-selected styrene butadiene, polyisobutylene, and cis-1,4-polyisoprene rubbers of the correct molecular weight range have been pre-pigmented on a two-roll mill prior to solution; (2) the forced pigmentation has insured uniform distribution of pigment particles, or paste among the rubber matrix; (3) the bulk of the pigmentation has been performed on effectively higher shear equipment rather than in planetary or sigma blade ink mixers to provide for uniform ink coloration without substantially reducing the optimum plasticity and viscoelasticity of the elastomeric matrix; (4) a pigmented paste is preferred to allow sufficient lubricity so that mixing on a two-roll mill does not break down the elastomeric matrix below the optimum Mooney viscosity range; (5) the ink mixing procedure merely requires solution of masticated pre-pigmented elastomers for completion.

ERASABLE INK COMPOSITIONS

Smoother writing erasable ball-pen inks of the present invention have been prepared that eventually become permanent quicker and more efficiently without compromising short-term erasability with a pencil eraser by using very low viscosity solvents (1.0–15 cps) such as light bodied oils that are further characterized by having boiling points or ranges between 180° C. and 300° C. at atmospheric pressure. Furthermore, vehicles whose viscosities are above 15 cps and that boil above 300° C. are employed in amount less than about 23 percent by weight of the total ink composition.

The acceptable range of components for the present invention has been found to be as follows:

TABLE 1

ACCEPTABLE RANGES OF COMPONENTS

| Components | Selected Type | % Amount by Weight |
|---|---|---|
| Elastomeric Polymer | Synthetic rubbers, such as styrene butadiene rubber, Natsyn 2200 and polyisobutylene, and mixtures thereof | 18–28 |
| Colorant | Pigment | 10–22 |
| Volatile Solvent | One compatible with the elastomer(s) chosen and having a boiling point less than 180° C., such as Lacquer Diluent #6 | 8–30 |
| Non-volatile low viscosity solvent having a boiling point at atmospheric pressure from 180° C. and less than 300° C. | Hydrocarbon Oil, Essential Oil, Petroleum Derivative, Plasticizer or Mixtures Thereof | 10–50.5 |
| Non-volatile high viscosity solvent or a plasticizer having a boiling point at atmospheric pressure above 300° C. | Heavy Mineral Oil or Plasticizer | 0 to less than 23 |
| Lubricants | Fatty Acids | 0–5 |

The preferred range of components in the following examples, percent by weight of the ink, has been found to be as follows: elastomeric polymer 24–27%, colorant 18–21%, volatile solvent 21–23%, non-volatile low viscosity solvent 10–13%, non-volatile high viscosity solvent less than 23%, and lubricants 2–3%.

The elastomer is selected from the group consisting of synthetic rubbers and mixtures thereof and preferably includes styrene butadiene rubber, polyisobutylene rubber, and synthetic cis-1,4-polyisoprene.

TABLE 2

SUITABLE ELASTOMERS AND THEIR SUPPLIERS

| Elastomer | Supplier and Location |
|---|---|
| styrene butadiene SBR Rubber (1506) | B. F. Goodrich Cleveland, Ohio |
| polyisobutylene Oppanol B50 | BASF Wyandotte Corp. Parsippany, New Jersey |
| cis-1,4-polyisoprene Natsyn 2200 | Goodyear Tire & Rubber Co. Akron, Ohio |

The amount of weight of the pre-pigmented elastomer is calculated to include the combined amounts by weight of the pigment and the elastomer present; and, where a flush pigment or a pigment paste is used may also include in addition to the weight of the elastomer and pigment the combined amount by weight of any resin and high boiling solvent that may be present.

Examples of suitable pigments include Victoria Blue, Alkali Blue and carbon black. The suppliers of such pigments are as follows:

TABLE 3

SUITABLE PIGMENTS AND THEIR SUPPLIERS

| Pigment | Supplier and Location |
|---|---|
| Victoria Blue | E. I. DuPont Wilmington, Delaware |
| Alkali Blue | Sherwin-Williams Co. Cleveland, Ohio |
| Carbon Black | Cities Co. Akron, Ohio |

Other colors will, of course, require the use of other pigments and there is no intent to limit the pigments to those listed. The only requirements of the pigments are that they impart the desired color to the ink and that they are sufficiently fine to readily pass through the clearance between the ball and retaining lip of the ball point; i.e., approximately 5 microns or less.

A preferred low boiling point or volatile solvent is Lacquer Diluent #6 supplied by Chem Central Company of Chicago, Ill. which has the property of being compatible with polyisoprene and has a boiling point between 94° C.-120° C. Suitable volatile solvents for the purpose of the present ink composition are considered to be those compatible with rubber having a boiling point less than 180° C. at atmospheric pressure and evaporating in less than 60 minutes. Included among the suitable volatile solvents are V M & P Naphtha having a boiling point range of 121°-139° C. and 100% evaporation in 8.3 minutes, 360-66 Naphtha having a boiling point range of 154°-173° C. and 100% evaporation in 42.1 minutes, toluene, as well as very volatile solvents such as hexane and pentane.

Suitable non-volatile low viscosity solvents include liquids having a viscosity within the range of 1-15 cps and having a boiling point less than about 300° C. and greater than about 180° C. and particularly include light bodied oils such as hydrocarbon oils and light mineral oils boiling between 180° C. and 300° C. and having a viscosity around 1.5 centipoise which viscosity is sufficiently low as to result in a final ink viscosity of between 500,000 and 4,000,000 centipoise. A preferred example would be Penreco 2257 oil, a product of Penreco, headquartered in Butler, Pa., a division of Pennzoil Company of Houston, Tex. Penreco 2257 oil has a viscosity of 1.5 centipoise at 25° C. and a boiling range of about 220° C. to 260° C. However, the non-volatile low viscosity component may also be a petroleum derivative such as kerosene having the aforesaid low viscosity and low boiling point; a low viscosity, low boiling point essential oil such as pine oil, a terpene alcohol; or this component may be a low viscosity, low boiling point plasticizer such as dimethyl phthalate and 2,2,4-trimethyl-1,3-pentanediol-diisobutyrate (KODAFLEX, TXIB) marketed by Eastman Kodak Company, Kingsport, Tenn. Table 4 below presents a listing of the physical properties of such suitable non-volatile low viscosity components, including 2257 oil.

TABLE 4

PHYSICAL PROPERTIES OF SUITABLE NON-VOLATILE LOW VISCOSITY COMPONENTS

| MATERIAL | VISCOSITY (25° C.) | BOILING RANGE (760 mm) | VOLATILITY (100% Evaporation rate*) |
|---|---|---|---|
| 2257 Oil | 1.50 cps | 222–260° C. | >1200 minutes |
| Magie 543 Oil | 1.60 cps | 236–277° C. | >1200 minutes |
| Kodaflex (TXIB) | 2.0 cps | 278° C. | slow >2000 minutes |

*As measured on a Shell "EvapoRater".

A suitable non-volatile, high viscosity solvent or plasticizer may be chosen from any one of the compounds listed in Table 5 below, but typically includes plasticizers and heavy mineral oils having boiling points in excess of 300° C.

TABLE 5

PHYSICAL PROPERTIES OF TYPICAL HIGH VISCOSITY COMPONENTS

| MATERIAL | VISCOSITY | BOILING POINT | VOLATILITY |
|---|---|---|---|
| D15 Mineral Oil | 58 cps | 385° C.* | very slow >5000 min. |
| Dioctyl Phthalate | 58 cps | 386° C. | very slow >5000 min. |
| Diisodecyl Phthalate | 88 cps | 410° C. | very slow >5000 min. |

*Average boiling point of boiling point range.

SOURCES FOR MATERIALS & DATA

Mineral Oils:
 1. Penreco; Los Angeles, Calif.
 2. Magie Bros. Oil Company; Los Angeles, Calif.
Plasticizers and Solvents:
 1. The Solvent and Chemical Companies; Los Angeles, Calif.
 2. Eastman Kodak; Kingsport, Tenn.

Suitable lubricants are those usually included in ballpoint pen ink formulations and include fatty acids such as oleic, stearic and lauric acids.

Where hydrocarbon resins are desirable, a suitable hydro-carbon resin is Nevchem 140 manufactured by Neville Chemical Company, Pittsburgh, Pa.

The following examples are illustrative of preferred embodiments but should not be construed in any way as limiting the present invention. In these examples components designated as volatile solvents have a boiling point less than 180° C. at atmospheric pressure and the non-volatile low viscosity solvents have a viscosity of 1-15 cps and a boiling point ranging from 180° C. to 300° C. The non-volatile substantially high viscosity solvent or plasticizer has a viscosity of 58 cps or more and a boiling point greater than 300° C. at atmospheric pressure.

EXAMPLE I—COLOR BLUE

| Components | Selected Type | % Amount by Weight |
|---|---|---|
| Elastomeric Polymer | SBR Rubber (1506) | 26 |
| Colorant | Pigment (50/50-alkali blue and victoria blue) | 18 |
| Volatile Solvent | Toluene | 23 |
| Non-volatile low viscosity solvent | Magie 543 | 7 |
| Non-volatile substan- | TXIB | 6 |

-continued

| Components | Selected Type | % Amount by Weight |
|---|---|---|
| tially high viscosity solvent or plasticizer | Dioctyl Phthalate | 20 |
| | | 100 |

EXAMPLE II—COLOR BLACK

| Components | Selected Type | % Amount by Weight |
|---|---|---|
| Elastomeric Polymer | SBR Rubber (1506) | 24 |
| Colorant | Carbon Black | 14 |
| | Alkali Blue | 7 |
| Volatile Solvent | Lacquer Diluent #6 | 11 |
| | Toluene | 11 |
| Non-volatile low viscosity solvent | Magie 543 | 12 |
| Non-volatile substantially high viscosity solvent or plasticizer | Di-octyl phthalate | 12 |
| | Di-isodecyl phthalate | 7 |
| Lubricant | Lauric Acid | 2 |
| | | 100 |

EXAMPLE III—COLOR BLUE

| Components | Selected Type | % Amount by Weight |
|---|---|---|
| Elastomeric Polymer | SBR Rubber (1506) | 17 |
| | Cis-1,4-Polyisoprene (Natsyn 2200) | 9 |
| Colorant | Pigment (50/50-alkali blue and victoria blue) | 18 |
| Volatile Solvent | Toluene | 23 |
| Non-volatile low viscosity solvent | Magie 543 | 13 |
| Non-volatile substantially high viscosity solvent or plasticizer | Dioctyl Phthalate | 20 |
| | | 100 |

EXAMPLE IV—COLOR BLUE

| Components | Selected Type | % Amount by Weight |
|---|---|---|
| Elastomeric Polymer | SBR Rubber (1506) | 14 |
| | Oppanol B50 | 13 |
| Colorant | Pigment (50/50 alkali blue and victoria blue) | 20 |
| Volatile Solvent | Lacquer Diluent #6 | 10 |
| | Toluene | 11 |
| Non-volatile low viscosity solvent | Magie 543 Oil (1.6 cps) | 5 |
| | 2257 oil | 5 |
| Non-volatile substantially high viscosity solvent or plasticizer | Di-octyl phthalate | 22 |
| | | 100 |

The ballpoint pen inks of this invention are more viscous than the customary glycol based ballpoint pen inks and therefore are more suitable for use in a pressurized cartridge. The exact pressure required will be dependent upon the opening between the ball and lip of the point used, the viscosity range of the final ink composition, and the amount of ink and volume of the tube used to contain the ink. It has been found that one desirable ink pressure medium is compressed air.

The pressurized cartridge utilizes a solid piston that is positioned on top of the ink supply and forwardly of the pressure producing medium. The follower has a central section that is cylindrical in shape and has its two ends formed as conical portions so that no specific orientation in assembly is required.

It is to be understood that the form of the invention herein above shown and described is to be taken as the preferred examples of the same, and that various changes in the components and the quantities thereof may be resorted to, without departing from the spirit of the invention or scope of the appended claims.

I claim:

1. In a ball point writing instrument containing an ink capable of depositing a trace on an absorbent, paper-like writing surface having minute voids therein, said trace being characterized by initial erasability thereof by ordinary pencil erasers and developing permanence over a period of time, said ink comprising pre-pigmented elastomer dispersed in a solvent system, said pre-pigmented elastomer comprising a pigment and a solid hydrocarbon elastomer component in which the elastomer component has a Mooney viscosity within a desired range and being selected from styrene butadiene rubber, with or without polyisobutylene rubber, and the pigment is force impregnated into the elastomer component prior to the pre-pigmented elastomer being dispersed in the solvent system, said pre-pigmented elastomer and said solvent system comprising a volatile component and an essentially non-volatile component both of which are solvents for the elastomer component and in which the volatile component has a boiling point of less than 180° C. and is present in amount of 30% or less of the weight of the ink, said essentially non-volatile component having a boiling point of greater than 180° C. and being present in an amount to result in a final ink viscosity of between $0.5 \times 10^6$–$4 \times 10^6$ cps.

2. In a ball point writing instrument containing an ink capable of depositing a trace on an absorbent, paper-like writing surface having minute voids therein, said trace being characterized by initial erasability thereof by ordinary pencil erasers and developing permanence over a period of time, said ink comprising a pigment, solid hydrocarbon elastomer dispersed in a solvent system, said elastomer having a Mooney viscosity within a desired range and being selected from styrene butadiene rubber, with or without polyisobutylene rubber, said solvent system comprising a volatile component and an essentially non-volatile component both of which are solvents for the elastomer component and in which the volatile component has a boiling point of less than 180° C. and is present in amount of 30% or less of the weight of the ink, said essentially non-volatile component including a non-volatile low viscosity solvent having a boiling point at atmospheric pressure from 180° C. and less than 300° C. present in an amount of about 10-50.5% by weight of the ink, and a non-volatile high viscosity solvent or a plasticizer having a boiling point at atmospheric pressure above 300° C. being present in an amount of 23% or less of the ink.

3. In a ball point writing instrument containing an ink capable of depositing a trace on an absorbent, paper-like writing surface having minute voids therein, said trace being characterized by initial erasability thereof by ordinary pencil erasers and developing permanence over a period of time, said ink comprising a pigment, solid hydrocarbon elastomer dispersed in a solvent system, said elastomer having a Mooney viscosity within a desired range and being a masticated synthetic rubber not having the chemical structure of natural rubber, and mixtures thereof, said solvent system comprising a volatile component and an essentially non-volatile component both of which are solvents for the elastomer component and in which the volatile component has a boiling point of less than 180° C. and is present in amount of 30% or less of the weight of the ink, said essentially non-volatile component including a non-volatile low viscosity solvent having a boiling point at atmospheric pressure from 180° C. and less than 300° C. present in an amount of about 10–50.5% by weight of the ink, and a non-volatile high viscosity solvent or a plasticizer having a boiling point at atmospheric pressure above 300° C. being present in an amount of 23% or less of the ink, said ink having a final viscosity of between $0.5 \times 10^6 - 4 \times 10^6$ cps.

4. In a ball point writing instrument as defined in claim 3 wherein said masticated synthetic rubber is styrene butadiene rubber.

5. In a ball point writing instrument as defined in claim 4 wherein said masticated synthetic rubber is in admixture with polyisobutylene.

* * * * *